Patented July 8, 1947

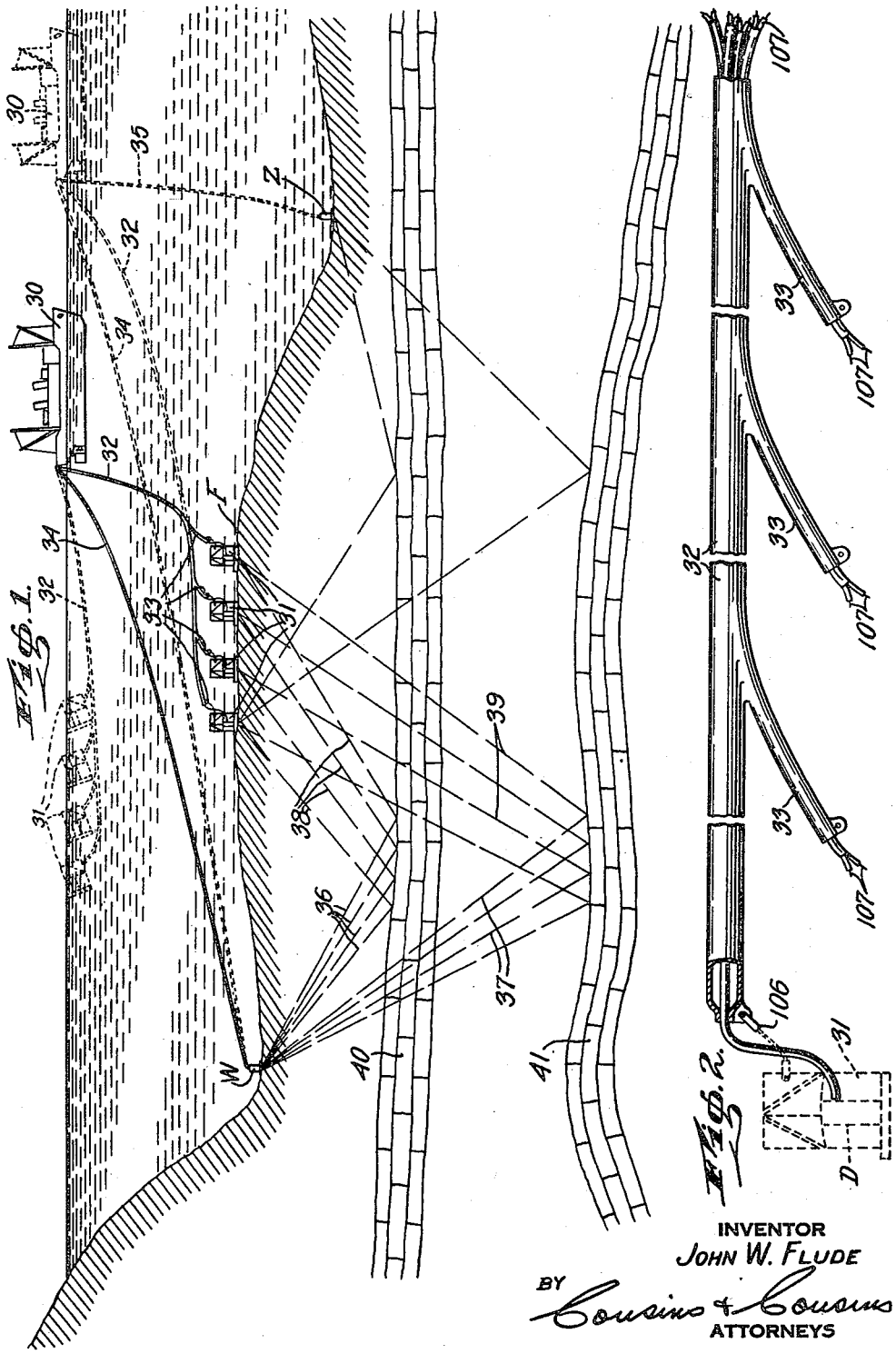

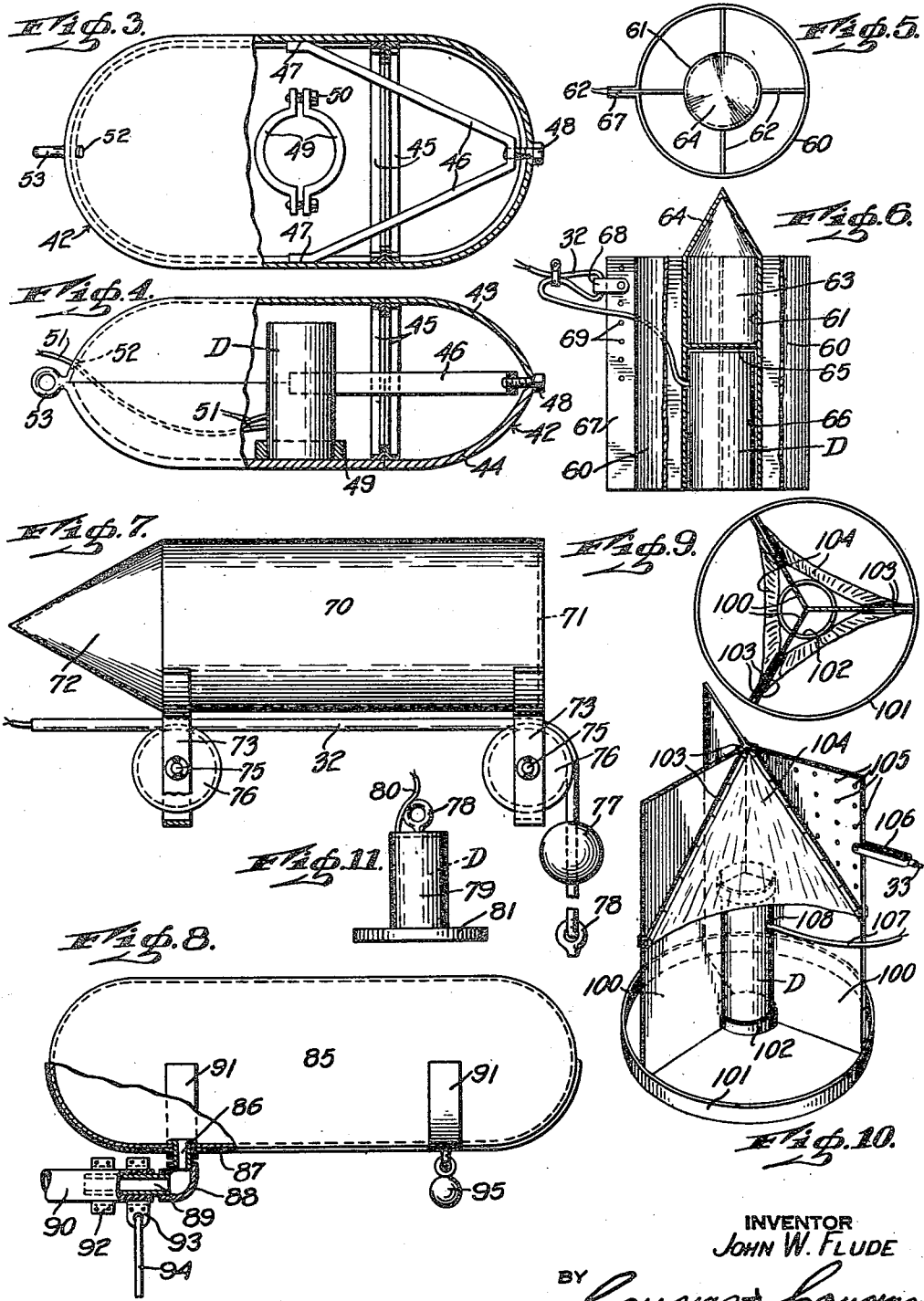

2,423,591

UNITED STATES PATENT OFFICE 2,423,591

APPARATUS FOR MAKING GEOPHYSICAL SURVEYS UNDER WATER

John W. Flude, Houston, Tex.

Original application September 16, 1939, Serial No. 295,198, now Patent No. 2,283,200, dated May 19, 1942. Divided and this application March 7, 1942, Serial No. 433,731

5 Claims. (Cl. 177—352)

This invention relates to apparatus for determining the location of under-sea mineral bodies, particularly of a fluid nature, as oil, and is a division of an application entitled "Method and apparatus for sub-surface mining," filed September 16, 1939, Serial No. 295,198, now Patent No. 2,283,200, issued May 19, 1942.

The invention is directed to combined electrical and mechanical devices for making geophysical investigations in locating and defining subterranean, under-water deposits.

Seismographic exploration of sub-surface formations, particularly such as contain oil, salt or sulphur, is well known. It is usually accomplished by an electrical seismograph, comprising a detector or "geophone" capable of detecting the slightest earth vibrations.

The detector is commonly of the coil and magnet type, connected to an amplifier of the electric current generated by the detector, and a galvanometer type of oscillograph, so arranged that a light beam, reflected by a mirror on the galvanometer, records ground waves on a moving strip of photo-sensitive material.

When the seismograph is placed in a predetermined position, with respect to one or more "shot points," it records the amplitude and frequency of the reflected and refracted waves resulting from a shock created at such points.

Analysis of the developed photographic strip enables a geophysicist to determine, with fair accuracy, the nature of the sub-surface formations at various levels between the detectors and shot points.

The principal object of the invention is to provide apparatus to carry into effect the steps of the method disclosed in application Serial No. 295,198, now Patent No. 2,283,200, issued May 19, 1942.

A specific object of the invention is the provision of a towing cable having a number of taps so that a plurality of detectors may be towed and used in pre-determined spaced relationship.

A further specific object of the invention is to provide a holder for a detector so constructed that the detector may be readily lowered or raised at a pre-determined location.

A further object is the provision of a detector holder which will rise substantially in a vertical path from the bottom for use where the bottom may be uneven or rocky.

These and other objects are accomplished by the novel construction, combination and arrangement of parts hereinafter described and shown in the accompanying drawings, constituting a material component of this disclosure, and in which:

Figure 1 is a diagrammatic sectional view illustrating certain geological formations below bodies of water, and equipment required in making a geophysical survey in accordance with the invention.

Figure 2 is a side view of a loom having a plurality of lateral outlets each carrying an independent cable by which an electric current is conveyed from the detectors.

Figure 3 is a partial plan, partial sectional view of a detector carrier.

Figure 4 is a side view of the same, parts being broken away.

Figure 5 is a top plan view of a modified form of detector carrier.

Figure 6 is a side view thereof, partially broken away to show the construction.

Figure 7 is a side view of a float used in the under-water survey.

Figure 8 is a side view, partially in section, of a modified form of float.

Figure 9 is a top plan view of a further modification of detector carrier.

Figure 10 is a perspective view thereof.

Figure 11 is a side view of one form of detector casing.

Referring in greater detail to the drawings, the numeral 30 designates the exploration ship proceeding on its plotted course a predetermined distance, during which a plurality of detector carriers 31 are towed astern by a loom or multiple conductor carrying cable 32 having a plurality of taps 33 of equal length and equidistantly spaced.

Wires are enclosed in the cable and taps, connecting with recording apparatus carried by the ship 30. Another conductor containing cable 34 is payed out from the ship maintaining connection with an explosion or shot point W.

The detector carriers, of which several forms are disclosed, are adapted to be towed at spaced intervals without fouling the cables, either at or below the surface, preferably as indicated in dotted lines in Figure 1, or they may be at or adjacent the bottom, depending upon their design.

These carriers, irrespective of their type, are deposited at regularly spaced distances, astern of the ship and arranged to settle upon the floor F of a body of water in vertical position, when tension on the loom 32 is relaxed.

In the full lines in Figure 1 is shown the spaced position of the carriers 31 when settled on the floor F, the tension on the loom being slackened. It is to be understood that the carriers 31 are greatly exaggerated with respect to the ship 30, and their spacing reduced for illustrative purposes.

The ship 30, dispensing the cable 34, which is connected to the detonating charge W, may proceed to a position indicated by the broken lines, at which position the geophysical exploration party may plant another charge, as at Z, spaced a predetermined distance from the charge W and from the detector carriers 31, and connected by a conductor 35 to the ship. Markings may be provided at spaced intervals on the cables 32, 34 and 35, as aids in determining the proper recording position of the ship 30.

The charges W and Z are exploded consecutively and the record of the amplitude and frequency of the waves produced, travelling over paths 36—37, which are reflected at 38—39 to detectors in the carriers 31, obtained in known manner, so that the approximate location and nature of the underlying geological formations 40—41 may be ascertained.

In Figures 3 and 4 is shown a form of detector carrier 42 adapted to be towed either over land or under water. The device is preferably constructed in a generally walnut shape consisting of cupped halves 43 and 44, the latter being placed over the former and secured thereto as by welding.

Preferably the respective halves of the shell are formed of strong, relatively heavy metal, the lower half 44 being much thicker than the upper, so that it acts somewhat as a keel in order to insure the travel of the shell in a position so that it will hold the detectors D in an upright position.

The shell may be cut adjacent its rear end and the interior surface adjacent the cut provided with angle members 45 securely welded to the forward and rear portions of the separate parts formed by the cut.

A V-shaped bar 46 may be welded to the foremost section of the shell, as at 47, the apex portion being bored and tapped to receive holding means, such as a bolt 48, which may be an eyebolt if more than one carrier of this type is to be towed in series. When the two sections are placed in proper alignment the bolt may be extended through the rear end of the shell and screwed into the V-shaped member 46 in order to hold the two sections together.

On the base or lower shell member 44 is secured a collar 49 clamped by bolts 50. A detector D placed within the collar members may be firmly held in position by taking up on the bolts 50. Wires 51 may be extended through an aperture 52 in the forward end of the casing to which latter is secured an eye 53.

When the device of Figures 3 and 4 is to be used, a cable is attached to the eye 53, and the wires 51 either secured to the outside of the cable or connected to conductors therewithin, in order that the electrical impulses, generated by the detector when in position to detect ground motion, may be carried to the amplifying and recording system of the seismograph.

In Figures 5 and 6 is illustrated another form of detector-carrying device consisting of two hollow concentric cylinders 60 and 61 joined by a plurality of radially extending fins or blades 62. The upper part of the inner cylinder 61 is constructed in the form of an air-tight buoyant chamber 63 by sealing the upper end with a conical member 64 and providing a disc-like diaphragm 65 somewhat above the central portion of the cylinder. A lower chamber 66 is thus provided in the lower portion of cylinder 61, below the diaphragm 65, which lower chamber is adapted to hold a detector D.

One of the fins 62 is extended beyond the periphery of the outer cylinder 60 and portions of the outer cylinder are bent outwardly to extend parallel in contact therewith. This provides a re-inforced external fin 67 to which a towing cable 32 may be attached, as through a connection 68 secured to the carrier by pins extending through apertures 69.

In the external fin assembly apertures may extend respectively through the outer cylinder 60 and the inner cylinder 61 so that the detector D within the chamber 66 may be connected with the seismographic apparatus aboard the vessel, as through conductors disposed within the towing cable 32.

The carrying device shown in Figures 5 and 6 is of very sturdy construction and is adapted to be towed through the water without excessive resistance. When the towing cable is secured by a clevis arrangement, such as that shown, to one of the apertures 69 in the outwardly extending fin 67 the device assumes an oblique position in the water, the specific angle of obliquity being determined by the particular aperture to which the cable is connected.

When the towing cable is slacked off, the device settles to the bottom in the approximate position illustrated in Figure 6, the buoyancy of chamber 63 and the weight of the detector in the chamber 66 assisting in this respect.

As the device settles to the bottom, the movement of water through the space between the respective cylinders and along the faces of the fins, further insures the downward movement of the device in a substantially upright position.

When tension is again placed on the towing cables, the guiding surfaces again come into play and the device rises substantially vertically from its position on the bottom, gradually turning in the direction in which it is towed until it assumes its normal oblique towing position.

Under certain conditions it may be desirable to connect the towing cable to the apex of the cone 64 in order to insure movement of the carrier through the water in the direction of its longitudinal axis.

In Figure 7 is illustrated a float device by which the detector D is raised after the required sesimographic records are taken. The float proper is made of sturdy material constructed in the form of a cylinder 70, one end of which is closed by a flat plate 71 and the other end, preferably the forward end, closed by a conical member 72, the assembly being securely held together, as by welding, in the form of a water-tight float.

To the outer surface of the cylindrical portion of the float are secured a pair of straps 73, the ends following the contour of the cylindrical surface of the float and the central portion of which extend downwardly in the form of a U. The sides of the U are apertured, in order to serve as bearings for shafts 75 to which sheaves 76 are secured.

This construction enables the cable 32, by or through which one or more detectors D may be connected to the towing vessel, to be reeved through the sheaves. The end of the cable 32 is preferably provided with a weight 77 located somewhat above the end of the cable, which end is secured to an eye 78, see Figure 11, on a housing 79 in which a detector D is housed.

The housing 79 has an aperture through which a pair of wires 80 may be extended in order to connect the detector with the towing vessel, as through conductors located within the towing cable 32.

It is desirable to provide a relatively heavy base 81 for the housing 79 in order to insure the detector assuming an upright position when the casing is lowered to the bottom.

When the owing cable 32 is slacked off, the combined weights of the housing 79, detector and weight 77, cause the detectors to settle rapidly to the bottom, the cable 32 running freely over sheaves 76. When the detector is on the bottom, the weight 77 serves to take the strain of any small jerks on the cable, caused by the float bobbing up and down in the water, which jerks might seriously interfere with the operation of the detectors.

The weight 77 also acts as a stop so that when the cable 32 is again placed under tension, the same may run over the sheaves 76 until the weight 77 stops any further progress of the cable through the pulley sheaves, at which time the float starts moving forward in the direction of the tow, at the same speed as that of the towing vessel.

A plurality of floats, like that shown in Figure 7, may be towed by securing them upon separate extensions or taps 33 from a main cable 32, each tap being at least twice as long as the depth of the water to be surveyed. When the towing vessel is in motion, the device, due to water resistance, will be at the extremity of the tap, and supporting the detector.

When the towing cable is relaxed by the towing vessel, water resistance on the cable and device will tend to stop its forward motion and gravity will cause the detector to sink to the bottom. Gravity will also cause the main towing cable to sink to the bottom. Therefore, if the float is to remain on the surface, (which may be desirable though not necessary) the tap must be more than twice the water depth in length, as for instance, the taps may be as much as 250 feet long.

In Figure 8 is illustrated a collapsible type of float consisting of an inflatable body 85 connected through a nipple 86, sealed within the body of reinforcement 87, elbow 88, nipple 89, and air hose 90 to the towing vessel 30, in a manner similar to that illustrated diagrammatically in Figure 2. Straps 91 of flexible material may be secured to the exterior of the body 85 in order to assist in supporting re-enforcement 87, elbow 88 and its associated structure.

A clamp 92 may be secured around the hose 90 in order to hold it securely to the nipple 89, and a similar clamp 93 may be secured around the hose 90 and provided with a ring 94, to which a detector, such as that indicated in Figure 11, may be attached.

The strap at the rear may be provided with a loop to which a weight 95 may be secured, the latter acting to bring the body to the bottom when the same is deflated.

It will be observed that when the device of Figure 8 is inflated through the towing hose 90, it assumes in general the position indicated in that figure, the detector secured to ring 94 and the weight 95 secured to the rear strap, serving to balance the body fore and aft in such manner as most effectively to insure the easy progress of the assembly through the water as it is being towed.

When the pressure within the body 85 is released, as by opening a valve in the vessel end of hose 90, the body collapses, and the combined weight of the detectors and the weight 95 causes the same to sink rapidly to the bottom of the ocean or other body of water in which the survey is being made.

It will be noted that the detector, being provided with a relatively heavy base 81, assumes an upright position on the bottom. When in such position the small weight 95 serves to hold the collapsed float to the bottom, thereby minimizing the possibility of disturbance to the detector by movement of the water in the vicinity of the detectors.

After recording a seismogram the float is again inflated as by means of a pump on the towing vessel, thus causing the float and the detectors to rise to the surface from which they can be towed through towing means 90 to the next recording position.

In Figures 9 and 10 is shown a further form of detector carrier, in the form described in connection with the description of the surveying method illustrated in Figure 2, and represents the presently preferred form of carrier constructed in accordance with the principles herein disclosed.

Radially extending fins or ribs 100 are secured at their upper inner edges in the manner shown, their lower inner edges being cut out a sufficient distance to provide a space for a detector D. At the bottom of fins 100 are provided concentric rings 101 and 102, the latter serving to hold the bottom of the detector in position. The outer ring 101 preferably encompasses the outer edges of the fins 100, as shown more particularly in Figure 10, so that the assembly is held together in a strong and secure manner.

In order to provide a parachute effect, a strip 103 may be extended obliquely across the face of each fin 100, which strip may be secured to the respective fins by screws extending through the strip and into holes in the fins. Between each strip and each fin the edges of a flexible member 104 may be secured, the member being, for instance, in the form of a vulcanized rubber sheet, the intermediate portion of which is sufficiently loose so that when the device is moved in an upward direction the members 104 will lie substantially flat along the sides of the fins 100.

One of the fins 100 is provided with apertures 105, to one of which a tap 33 of the towing cable 32 may be attached as by clevis 106. The angle at which the device will lie as it is being towed through the water is determined by the particular aperture to which the cable is attached, as is also the trajectory of the device as it is moved from its position on the bottom when tension is applied to the cable taps 33.

The cable 32 preferably contains conductors 107 which extend from the end of the cable, through an aperture in the flexible members 104, along the sides of the fins 100 and through apertures 108 in the detector D, thus providing a means for electrically connecting the detector with the amplifying and recording apparatus on the vessel.

The provision of a "parachute" 104 may not always be found desirable, but in some cases it will be found advantageous in order to cause a slow descent of the detector and to insure that the towing cable 32 sinks to the bottom first and there remains stationary. This avoids the possibility of movement of the cable and disturbance of the detector during the time the detector rests upon the bottom.

In practice it may be preferred to re-arrange certain details, as for instance, in the device shown in Figures 9 and 10, the plates forming the fins or ribs 100 may be arranged to form a device of a triangular cross section that may be efficiently towed from a point at or near any upper corner. Similarly, the device indicated in Figures 5 and 6 may be modified by changing the cylinder to a hollow body of rectangular, rather than circular cross section, in which case the towing cable would be attached at or near any upper corner.

Although the improvements have been described with considerable detail, and with respect to certain particular forms of the invention, it is not desired to be limited to such details since many changes and modifications may well be made without departing from the spirit and scope of the invention in its broadest aspect.

Having thus described the invention, what is claimed as new and desired to secure by Letters Patent, is:

1. An apparatus for towing an instrument through the water, comprising a pair of concentric rings, radial fins connected thereto, an instrument casing disposed within the inner ring and contacting the inner edges of said fins, a plurality of flexible members loosely connecting said fins and secured to each along a line diagonally thereof, and a plurality of apertures in one of said fins within the triangle formed by said diagonal lines.

2. An apparatus for towing an instrument through the water comprising a pair of concentric rings, radial fins connected thereto, an instrument casing disposed within the inner ring and contacting the inner edges of said fins, and a plurality of apertures in one of said fins within a corner thereof.

3. In an apparatus for submarine seismographic exploration, a detector for seismographic impulses, a carrier therefor, said carrier comprising a series of three upright plates arranged in triangular formation, a ring connecting the outer base edges of said plates, means to support said carrier vertically between the lower proximal edges of said plates, flexible diaphragms secured in pyramidal form to the adjacent sides of said plates to extend therebetween, and a haulage cable adjustably attached to one of said plates.

4. In an apparatus for submarine seismographic exploration, a detector for seismographic impulses, a carrier therefor, said carrier comprising a series of three upright plates arranged in triangular formation, a ring connecting the outer base edges of said plates, means to support said carrier vertically between the lower proximal edges of said plates, and distensible webs disposed between the contiguous sides of said plates, said webs extending from the tops of said plates at their juncture to their edges midway the length of the plates in triangular formation.

5. In an apparatus for submarine seismographic exploration, a detector for seismographic impulses, a carrier therefor, said carrier comprising rigid plates arranged in triangular formation, highly flexible webs connecting between adjacent plates, said webs being substantially triangular and disposed from points at the tops of said plates to their outer edges, means to support a detector in the central lower portion of said plates, and a plurality of perforations in one of said plates for the attachment of haulage cables.

JOHN W. FLUDE.

REFERENCES CITED

The following references are of record in the file of this patent:

UNITED STATES PATENTS

| Number | Name | Date |
|---|---|---|
| 1,315,122 | Henslee | Sept. 2, 1919 |
| 1,287,908 | Delany | Dec. 17, 1918 |
| 2,283,200 | Flude | May 19, 1942 |
| 737,866 | Pike | Sept. 1, 1903 |
| 1,470,733 | Hayes | Oct. 16, 1923 |
| 964,380 | Bowlker | July 12, 1910 |
| 2,300,565 | Goloviznin | Nov. 3, 1942 |
| 2,331,363 | Washburn | Oct. 12, 1943 |
| 1,594,069 | Rice | July 27, 1926 |
| 1,980,993 | Hayes | Nov. 20, 1934 |
| 2,241,428 | Silverman | May 13, 1941 |